(12) United States Patent
Lee et al.

(10) Patent No.: US 6,523,368 B2
(45) Date of Patent: Feb. 25, 2003

(54) DISPERSION-MANAGED FIBER PREFORM AND FABRICATING METHOD THEREOF BY MCVD

(75) Inventors: Jae-Deuk Lee, Jeonrabuk-do (KR); Yong-Woo Park, Seoul (KR); Ghie-Hugh Song, Seoul (KR); Un-Chul Paek, Kwangju-kwangyeok-shi (KR); Mun-Hyun Do, Kyonsangbuk-do (JP)

(73) Assignee: Samsung Electronics Co., LTD, Suwon (KR)

( * ) Notice: Subject to any disclaimer, the term of this patent is extended or adjusted under 35 U.S.C. 154(b) by 78 days.

(21) Appl. No.: 09/761,162

(22) Filed: Jan. 16, 2001

(65) Prior Publication Data

US 2001/0041038 A1 Nov. 15, 2001

(30) Foreign Application Priority Data

Jan. 14, 2000 (KR) ............................................. 00-1742

(51) Int. Cl.[7] ............................................. C03B 37/018
(52) U.S. Cl. ............................. 65/414; 65/412; 65/428; 65/378; 65/384; 385/123; 385/124
(58) Field of Search ................................. 385/123, 124, 385/127; 65/412, 414, 428, 378, 384

(56) References Cited

U.S. PATENT DOCUMENTS

| | | | |
|---|---|---|---|
| 4,049,413 A | 9/1977 | French | |
| 4,076,380 A | 2/1978 | DiMarcello et al. | |
| 4,857,091 A | 8/1989 | Geittner et al. | |
| 5,327,516 A | 7/1994 | Chraplyvy et al. | ......... 385/123 |
| 5,835,655 A | 11/1998 | Liu et al. | .................... 385/124 |
| 5,917,109 A * | 6/1999 | Berkey | ........................ 65/412 |

FOREIGN PATENT DOCUMENTS

| | | |
|---|---|---|
| JP | 56009236 | 1/1981 |
| JP | 56014431 | 2/1981 |
| JP | 56014433 | 2/1981 |
| JP | 56017941 | 2/1981 |

* cited by examiner

Primary Examiner—Robert H. Kim
Assistant Examiner—George Wang
(74) Attorney, Agent, or Firm—Steve Cha; Cha & Reiter

(57) ABSTRACT

There is provided a dispersion-managed fiber preform and a fabricating method thereof preform by modified chemical vapor deposition (MCVD). A core and a clad having the refractive index distribution of an optical fiber with a positive dispersion value are uniformly deposited in a glass tube. The preform with the positive dispersion value is heated at every predetermined period with a torch and the heated preform portions are etched to have a negative dispersion value. Then, the preform alternately having positions with the positive dispersion value and positions with the negative dispersion value along the length direction is collapsed.

13 Claims, 5 Drawing Sheets

DISPERSION-MANAGED FIBER PREFORM AND FABRICATING METHOD THEREOF BY MCVD

CLAIM OF PRIORITY

This application claims priority to an application entitled, "Dispersion-Managed Fiber Preform and Fabricating Method Thereof by MCVD", filed in the Korean Industrial Property Office on Jan. 14, 2000 and there duly assigned Serial No. 2000-1742.

BACKGROUND OF THE INVENTION

1. Field of the Invention

The present invention relates generally to a method for fabricating an optical fiber preform, and in particular, to a method for fabricating a dispersion-controlled fiber preform by a modified chemical vapor deposition (MCVD) process.

2. Description of the Related Art

Due to the wide bandwidth capabilities of optical fibers, the demand for optical communication has increased drastically. Basically, optical fibers have a bandwidth that is wide enough to exchange a large amount of data and video signals via a strand of optical fiber. The transmission capacity of an optical fiber increases as its dispersion value at the transmission wavelength decreases. Thus, in order to reduce the dispersion in the transmission window having the lowest attenuation, an optical fiber with a dispersion value of zero at 1550 nm (referred to as dispersion shifted fiber (DSF)) has been introduced. This dispersion shifting creates a fiber that shifts the low-dispersion region to the 1550-nm region.

In addition, the demand for optical communication is fueled by the late development of an erbium-doped fiber amplifier (EDFA). The EDFA can amplify optical signals into a wide wavelength band that ranges from 1530 nm to 1565 nm, thereby rendering the WDM (Wavelength Division Multiplexing) scheme viable as well as increasing the optical transmission capacity. Normally, optical signal channels at different wavelengths are transmitted via one optical fiber in the WDM scheme. However, a non-linear reaction between signals at different wavelengths, for example four-wave-mixing, significantly deteriorates the system performance in the WDM optical communication when a dispersion shifted fiber (DSF) is used.

Andrew R. Chraplyvy addressed this performance problem by introducing an optical fiber with a dispersion in the range of 2–6 ps/km-nm in the optical transmission wavelength band, as disclosed in U.S. Pat. No. 5,327,516 entitled, "Optical Fiber for Wavelength Division Multiplexing."

An optical fiber with a very low dispersion value for suppressing the non-linear effect is known as an NZDSF (Non-Zero DSF). Major providers of the NZDSFs are the TrueWave (™) of Lucent Technology and LEAF (™) (Large Effective Area Advantage Fiber) of Corning. The TrueWave (™) RS optical fibers of Lucent Technology are designed to have low dispersion values at the L-band range (Long-band 1565–1620 nm) as well as at the C-band range (Conventional-band 1530–1565 nm). On the other hand, the LEAF (™) fibers of Corning have a wider effective area when compared to other optical fibers in the market. For details, refer to U.S. Pat. No. 5,835,655, entitled "Large Effective Area Waveguide Fiber" by Yanming Liu, et. al. The advantage of the NZDSFs is that they provide wide effective areas as the non-linear effect of an optical fiber decreases.

Because the dispersion value of the NZDSF is very low but not zero, the products of the dispersion value and the transmission distance continue to increase when the transmission distance is long. As a result, the dispersion inevitably results in pulse spreading. To solve this problem, the so-called dispersion management has been suggested in which two NZDSFs with a positive dispersion value and a negative dispersion value, respectively, are connected in an alternate arrangement to prevent the dispersion accumulation. Such dispersion-managed WDM system is an ideal optical transmission system. To build a dispersion-managed line, optical fibers with a positive dispersion value and a negative dispersion value are separately fabricated and then alternately connected. However, this conventional method makes it difficult to install optical communication cables because different kinds of optical fibers must be installed alternately along the long optical fiber line. What is needed is an improved technique for manufacturing dispersion-managed optical fibers from a prefrom that is prepared by one continuous session of a modified chemical vapor deposition (MCVD) process.

SUMMARY OF THE INVENTION

It is, therefore, an object of the present invention to fabricate a dispersion-managed fiber preform using a modified chemical vapor deposition (MCVD) process.

It is another object of the present invention to provide a dispersion-managed fiber preform with a positive dispersion length for a first predetermined length and a negative dispersion value for a second predetermined length.

It is a further object of the present invention to provide a dispersion-managed fiber preform from which an optical fiber is drawn to have a positive dispersion value for a first predetermined length and a negative dispersion value for a second predetermined length.

It is still another object of the present invention to provide a dispersion-managed fiber preform that is uniformly deposited lengthwise and selectively etched to have different refractive index profiles along the length direction prior to the tube sealing under the MCVD process.

It is yet another object of the present invention to provide a dispersion-managed fiber preform that has the refractive index distributions of an NZDSF+ and an NZDSF−, by making the core portions different in thickness and an identical refractive index distribution in the other core portion.

To achieve the above objects, a core and clad having the refractive index distribution of an optical fiber with a positive dispersion value are uniformly deposited in a glass tube. The preform with the positive dispersion value is heated at every predetermined period with a heater and then the heated preform portions are etched by fluorine to have a negative dispersion value. Thereafter, the preform with the alternate, positive dispersion value and the negative dispersion value along the length direction is collapsed.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENTS

A preferred embodiment of the present invention will be described hereinbelow with reference to the accompanying drawings. For the purpose of clarity, well-known functions or constructions are not described in detail as they would obscure the invention in unnecessary detail.

Figure 1:
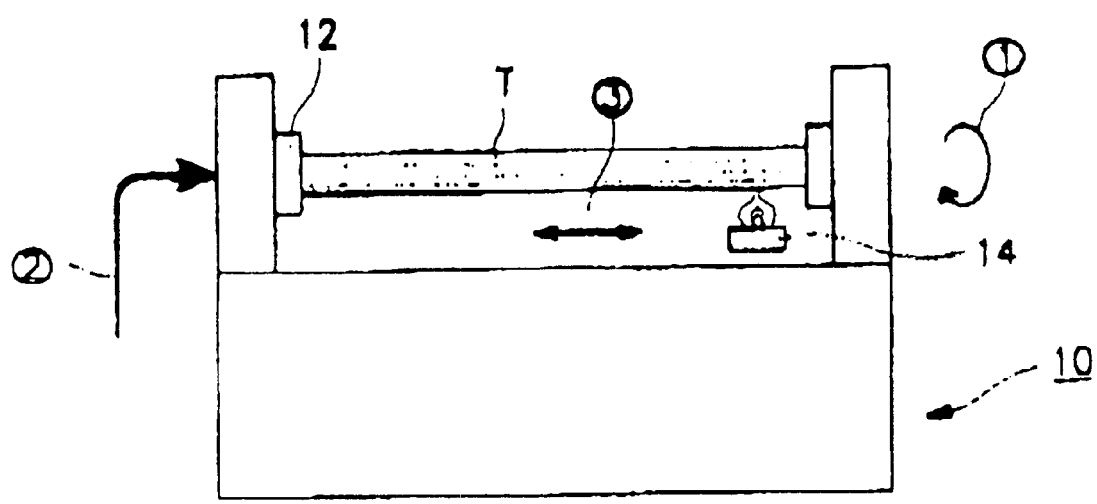
FIG. 1 is a schematic view of a general fiber preform fabricating apparatus by the MCVD process.

Referring to FIG. 1, as the MCVD technique is well known in the art, a brief description of major components and its interoperability will be described. A glass tube T is fixed to both chucks 12 that are mounted in a horizontal orientation to be rotated in the direction indicated by an arrow (1), then heated by a torch 14 that is being translated in the direction indicated by an arrow (3). At the same time, $SiCl_4$ and other chemical gases along with oxygen gas are injected into the glass tube T in the direction indicated by an arrow (2) for deposition inside the glass tube T. After the deposition, collapsing and closing steps are executed so that a fiber preform can be fabricated.

The MCVD process involves supplying $SiCl_4$ and other chemical gases along with oxygen gas inside the glass tube T while heating the glass tube T with a moving torch at a predetermined rate, in order to provide a uniform lengthwise deposition.

Figure 2:
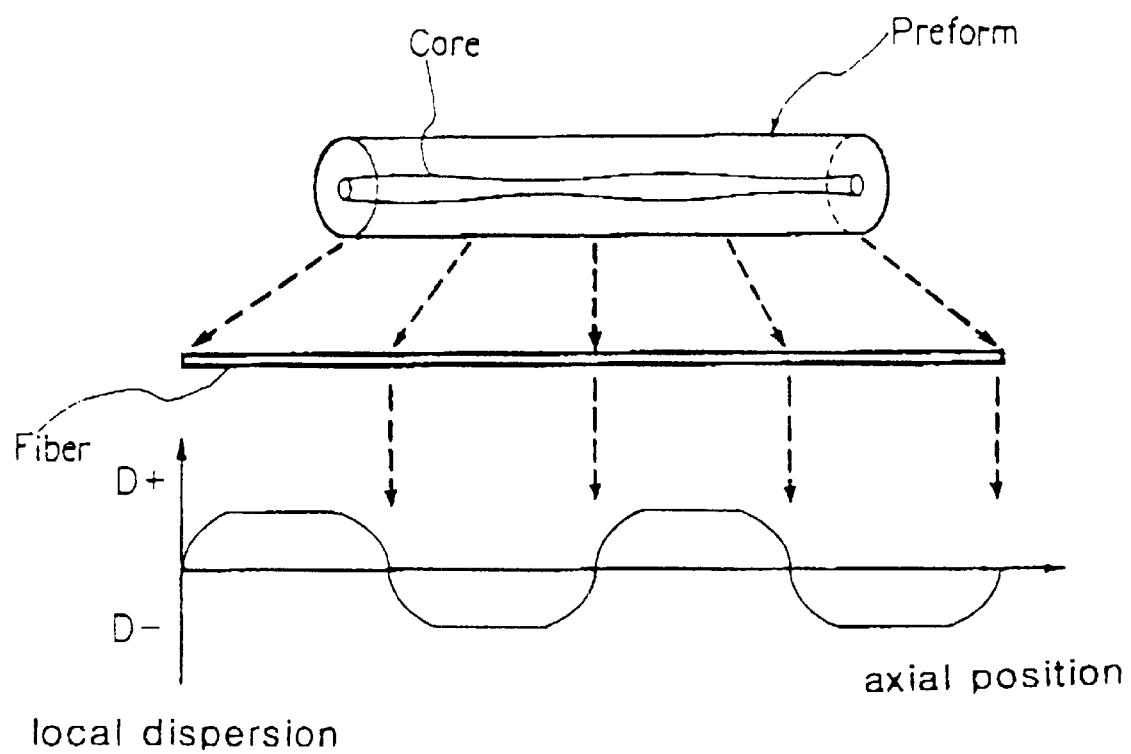
FIG. 2 illustrates the preform, the resulting optical fiber, and the local dispersion along the axial fiber length according to the present invention.

In order to fabricate an optical fiber cable with alternate positive and negative dispersion characteristics along the length of the fiber, an optical fiber preform must be developed in a controlled manner in which the refractive index distribution corresponding to the positive dispersion for a first predetermined length alternates with the refractive index distribution corresponding to the negative dispersion for a second predetermined length. FIG. 2 illustrates such an optical fiber preform that exhibits these alternate refractive index characteristics. Accordingly, FIG. 2 illustrates the principle eliminating the signal distortion due to the dispersion accumulation according to the present invention in spite of having a non-zero dispersion value in an optical transmission wavelength band.

In the embodiment of the present invention, the refractive index distribution of an optical fiber (NZDSF+) with a positive dispersion value as low as 2.56 ps/km-nm and the refractive index distribution (NZDSF−) with a negative dispersion value is provided so that an optical fiber preform exhibiting the characteristics of FIG. 2 is obtained. To this end, two different refractive index distributions must alternate periodically along the lengthwise direction in an optical fiber preform, which is fabricated by the modified chemical vapor deposition (MCVD) process in accordance with the present invention and has the same composition profile as the final fiber.

Figure 3:
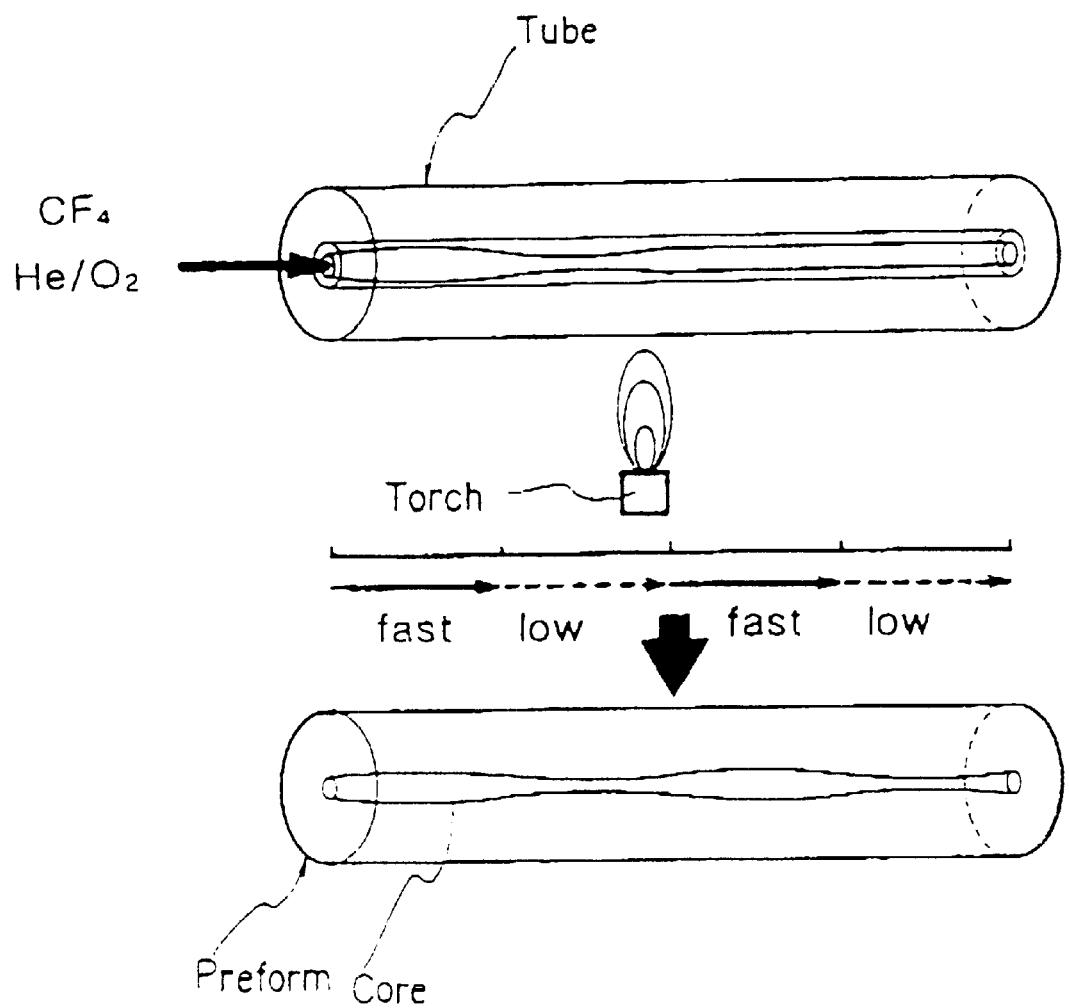
FIG. 3 illustrates the periodic etching of the MCVD tube to periodically change the refractive index profiles of the preform.

Accordingly, the present invention provides optimal refractive index distributions of the NZDSF+ and NZDSF− that enable the fabrication of an optical fiber preform exhibiting the characteristics, as shown in FIG. 2, using the MCVD process. To induce the alternate changes in the refractive index distribution during the fabrication of an optical fiber preform, a fiber preform is initially placed in the tube, as shown in FIG. 1, and rotated it about an axis, then the intended portions for refractive index variation are selectively etched through moving the torch to collapse the tube to form a solid fiber. Referring to FIG. 3, the selective etching is achieved by selectively varying the speed of torch being translated along the fiber preform. Motion of the torch 14 is alternatively changed to achieve the periodic etching while He or $O_2$ gases mixed with P-containing gas, such as $CF_4$ or $C_2F_6$, are flowed into the tube just prior to the final sealing of the collapsing tube, as shown in FIG. 3.

The non-etched and the etched sections of the preform should be designed to have positive and negative dispersion values, respectively. Therefore, a refractive index profile which has the positive dispersion in the original shape of the refractive index profile and the negative dispersion in the shape formed by internal etching is provided. Here, these two different index profiles also should satisfy all other modal characteristics of a single-mode fiber waveguide, such as the mode-field diameter, the cutoff wavelength, and the bendingloss requirement.

Figure 4:
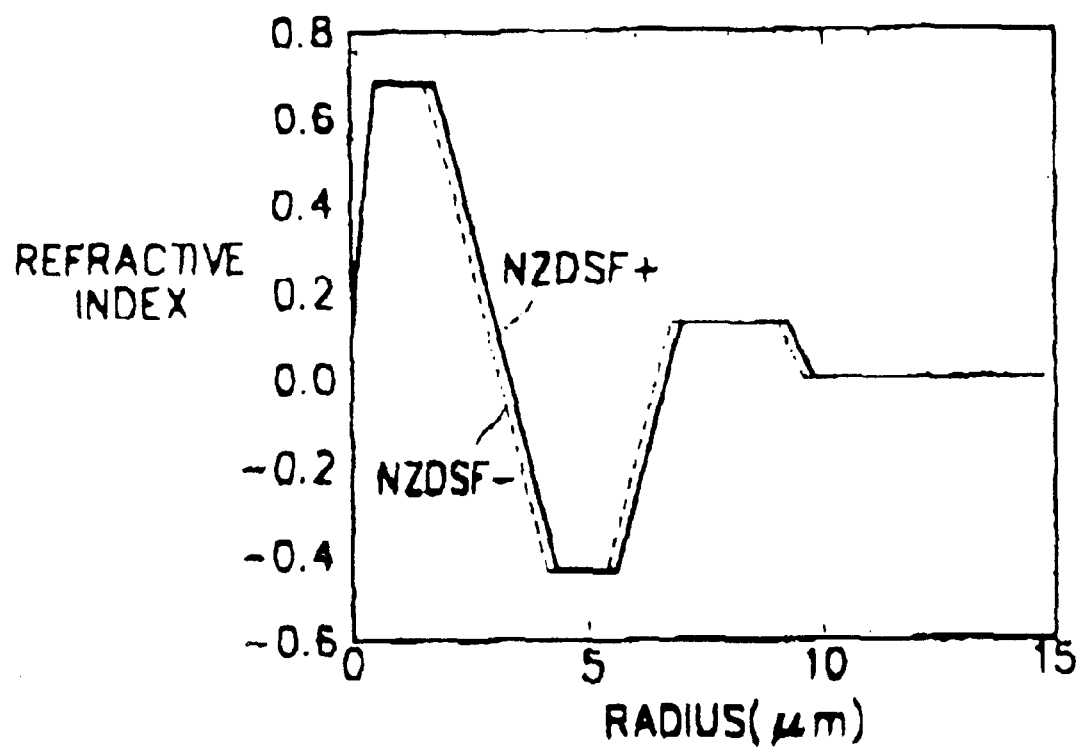
FIG. 4 is a graph showing the refractive index distribution of the dispersion-managed fiber preform according to the present invention; and, FIG. 5 is a graph showing dispersion spectra of an optical fiber with the refractive index distribution shown in FIG. 3 in the range of 1530 nm to 1565 nm.

FIG. 4 is a graph showing the refractive index distributions of a dispersion-managed optical fiber preform satisfying the above-described condition according to the present invention. A refractive index difference in quantity, $\Delta(\%)$, is defined as follows:

$$\Delta(\%)=[(n(r)-n_c)/n_c]\times 100 \tag{1},$$

wherein $n_c$ represents the refractive index of pure glass.

Accordingly, the fabrication of a dispersion-managed fiber from a preform prepared by a single session of the MCVD process is possible in the present invention.

Figure 5:
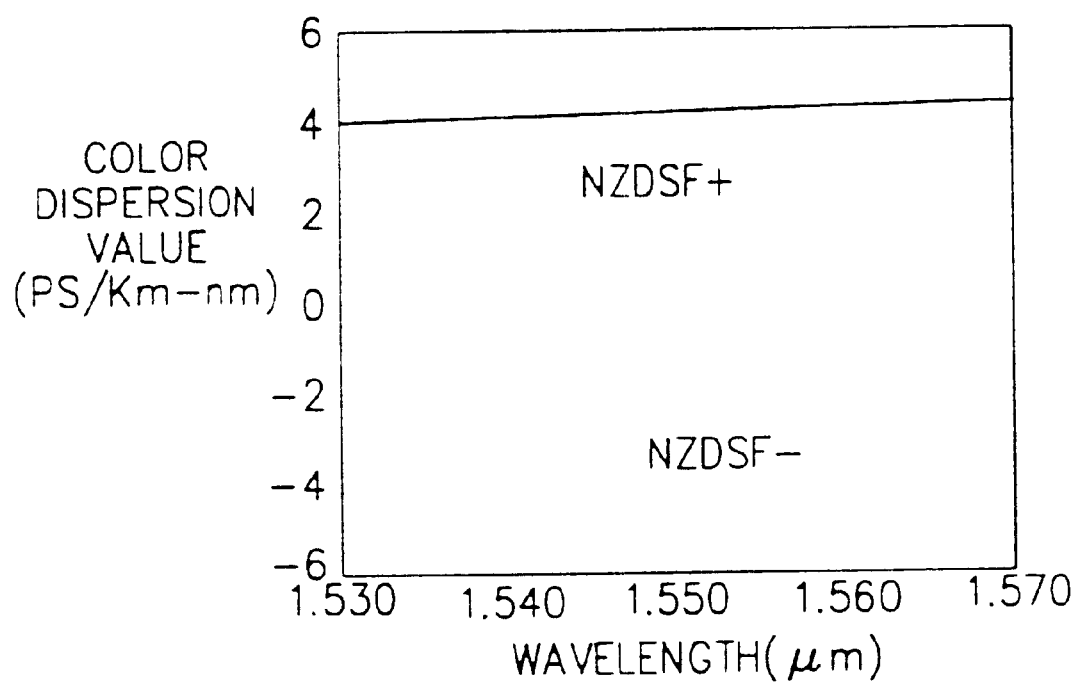

FIG. 5 illustrates dispersion values of optical fibers having the refractive index distribution shown in FIG. 4 in a wavelength band ranging from 1530 to 1565 nm. A positive dispersion fiber (NZDSF+) has a positive inclination as the wavelength increases, whereas a negative dispersion fiber (NZDSF−) has a negative inclination as the wavelength increases, but they have the same magnitude of dispersion. Therefore, if the transmission fiber has the refractive index profiles shown in FIG. 4 whose index profiles varies periodically along the fiber length, a complete dispersion management is achieved across the whole wavelength band of 1530 to 1565 nm.

As to the positive dispersion fiber, the dispersion ranges from 4.10 to 4.36 ps/km-nm at wavelengths from 1530 to 1565 nm, a dispersion inclination at 1550 nm is 0.0065 ps/km-nm$^2$, the $LP_H$ mode cut-off wavelength is 1.17 μm, and a mode filter diameter at 1550 nm is 7.56 μm.

As to the negative dispersion fiber, the dispersion ranges from −4.19 to −5.61 ps/km-nm at wavelengths from 1530 to 1565 nm, a dispersion inclination at 1550 nm is −0.0358 ps/km-nm$^2$, an $LP_H$ mode cut-off wavelength is 1.14 μm, and a mode filter diameter at 1550 nm is 8.39 μm.

The optical fibers having the refractive index distribution shown in FIG. 4 have small dispersion inclinations at wavelengths as shown in FIG. 5. Therefore, they can be used as an excellent NZDSF+ and NZDSF−.

In accordance with the present invention, a dispersion-managed optical fiber is drawn from a single optical fiber preform, as effective as the NZDSFs of a positive dispersion value and a negative dispersion value, respectively, that alternate with each other. When an optical fiber of a uniform diameter is drawn from an optical fiber preform according to the present invention and made into an optical cable, the cable itself becomes a dispersion management line. Furthermore, as positive and negative dispersion optical fibers having a refractive index distribution according to the present invention show a very flat dispersion spectra at transmission wavelengths, they can be used as an excellent NZDSF+ and NZDSF−.

While the invention has been shown and described with reference to a certain preferred embodiment thereof, it will be understood by those skilled in the art that various changes in form and details may be made therein without departing from the spirit and the scope of the invention as defined by the appended claims.

What is claimed is:

1. A method of fabricating an optical fiber preform through modified chemical vapor deposition (MCVD) process, comprising the steps of:
   (a) uniformly depositing a core layer and a clad layer defining said preform in a glass tube, said preform having the refractive index distribution of a positive dispersion value;
   (b) selectively etching said preform with a torch to provide at least one positive dispersion region and at least one negative dispersion region thereon by alternatively varying the speed of said torch being translated along said preform; and,
   (c) alternatively collapsing said preform having said at least one positive dispersion region and said at least one negative dispersion region along a lengthwise direction.

2. The method of claim 1, wherein said core layer is etched in step (b).

3. The method of claim 1, wherein etching of said preform is performed while injecting He or O2 gases mixed with F-containing gas into said tube.

4. The method of claim 1, wherein said heat application step (b) comprises the steps of applying said torch along said preform in a controlled manner so that at least one region of said heated preform provides a first region being exposed to said torch for a first predetermined period and at least another region of said heated perform provides a second region being exposed to said torch for a second predetermined period, wherein said first region and said second region are repeatedly adjoined to each other.

5. An optical fiber preform fabricated through modified chemical vapor deposition (MCVD) process, comprising:
   a plurality of first fiber preform portions having the refractive index distribution of a positive dispersion value along the lengthwise direction via said MCVD process; and,
   a plurality of second fiber preform portions having the refractive index distribution of a negative dispersion value along the lengthwise direction via a heat application,
   wherein said first portion and said second portion are adjoined to each other in an alternating fashion.

6. The optical fiber preform of claim 5, wherein said heat application is performed using a torch that is moving parallel to the axis in front of said preform.

7. The optical fiber preform of claim 6, wherein the speed of said torch is adjusted to produce said positive dispersion and said negative dispersion in an alternate fashion by adjusting the duration of said heat application.

8. The optical fiber preform of claim 5, wherein said preform is placed in a tube to rotate said preform about an axis.

9. The optical fiber preform of claim 5, wherein said MCVD process includes a periodic etching of said fiber preform that is performed by adjusting the motion of said torch being moved parallel to the axis in front of said fiber preform while being exposed to He or O2 gases mixed with F-containing gas.

10. An optical waveguide comprising:
    a first preform portion having a positive dispersion;
    a second preform portion having a negative dispersion, said second preform portion being connected to said first preform portion,
    wherein said first preform portion and said second preform portion are connected to each other in a repeating fashion to form said optical wave guide.

11. The optical waveguide of claim 10, wherein said first preform portion is exposed to a first heat application for a first predetermined time period, and wherein said second preform portion is exposed to a second heat application for a second predetermined time period.

12. The optical waveguide of claim 10, wherein said first preform portion comprises:
    a core region having a first concentration; and,
    a cladding region having a second concentration, wherein the arrangement of said first concentration and said second concentration produce positive dispersion.

13. The optical waveguide of claim 10, wherein said second preform portion comprises:
    a core region having a first concentration; and,
    a cladding region having a second concentration, wherein the arrangement of said first concentration and said second concentration produce negative dispersion.

* * * * *